US007033163B2

(12) United States Patent
Würtele

(10) Patent No.: US 7,033,163 B2
(45) Date of Patent: Apr. 25, 2006

(54) BACKFLOW PREVENTION DEVICE

(75) Inventor: Martin Würtele, Friedberg (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 407 days.

(21) Appl. No.: 10/419,716

(22) Filed: Apr. 21, 2003

(65) Prior Publication Data

US 2003/0232106 A1 Dec. 18, 2003

(30) Foreign Application Priority Data

Apr. 20, 2002 (DE) ................................ 102 17 758

(51) Int. Cl.
*B29C 45/23* (2006.01)

(52) U.S. Cl. ........................................ 425/559; 425/563

(58) Field of Classification Search ................ 425/559, 425/563
See application file for complete search history.

(56) References Cited

U.S. PATENT DOCUMENTS

| | | | | |
|---|---|---|---|---|
| 2,469,999 | A | 5/1949 | Stober | |
| 4,541,982 | A | 9/1985 | Upmeier | |
| 5,246,660 | A | 9/1993 | Tsutsumi | |
| 5,988,866 | A | 11/1999 | Barr | |
| 6,241,375 | B1 | 6/2001 | Wang | |
| 6,254,266 | B1 | 7/2001 | Barr et al. | |
| 6,554,603 | B1 * | 4/2003 | Schreiner et al. | 425/559 |
| 6,585,001 | B1 * | 7/2003 | Gatti | 425/563 |

FOREIGN PATENT DOCUMENTS

| | | |
|---|---|---|
| DE | 1 124 672 | 3/1962 |
| DE | 21 62 709 | 6/1973 |
| DE | 2722933 | 11/1978 |
| DE | 29 46 683 | 5/1981 |
| DE | 37 02 191 C2 | 11/1988 |
| DE | 198 36 871 A1 | 7/1999 |
| EP | 0 340 873 | 11/1989 |
| JP | 52 014659 | 2/1977 |
| JP | 54 50070 | 4/1979 |
| JP | 61 100427 | 5/1986 |

OTHER PUBLICATIONS

C. Rauwendaal: "Non-return valve with distributive and dispersive mixing capability", In: 58$^{th}$ SPE/ANTEX Proceedings, Antec 2000, vol. 1, May 2000.

* cited by examiner

*Primary Examiner*—Tim Heitbrink
(74) *Attorney, Agent, or Firm*—Henry M. Feiereisen

(57) ABSTRACT

A backflow prevention device for an injection molding machine includes a screw tip having a tip end, a central body member connected to the tip end, a thrust ring at a rear end of the body member, and a mounting end for attachment to a plasticizing screw. A locking ring is arranged at a distance to the body member to define an annular gap and is axially movable between an open position, in which a first sealing surface rests against a shoulder of the tip end, allowing passage of material, and a closed position, in which a second sealing surface rests against a shoulder of the thrust ring, prohibiting entry of material. Disposed in the annular gap coaxial to the locking ring is at least one mixing element in the form of a circular ring which has circumferential bores in spaced-apart disposition for axial material transport.

20 Claims, 3 Drawing Sheets

BACKFLOW PREVENTION DEVICE

CROSS-REFERENCES TO RELATED APPLICATIONS

This application claims the priority of German Patent Application, Serial No. 102 17 758.9-16, filed Apr. 20, 2002, pursuant to 35 U.S.C. 119(a)–(d), the disclosure of which is incorporated herein by reference.

BACKGROUND OF THE INVENTION

The present invention relates to a backflow prevention device positioned at an end of a plasticizing and injection screw to prevent backflow of plasticized material into screw flights of the screw.

Injection molding of plastic material involves the use of a screw which is received in a tubular barrel for movement in an axial direction and rotates in the barrel. The screw operates also as a plunger to inject plasticized material into a cavity of an adjacent injection mold, as the screw is moved in axial direction in the barrel. A backflow of plastic material during the injection process is prevented by the use of a backflow prevention device or non-return valve, whereby the backflow prevention device is typically arranged at the forward discharge-side end of the screw. It will be understood by persons skilled in the art that the terms "backflow prevention device" and "non-return valve" are used synonymous in the disclosure.

German Pat. No. DE 198 36 871 describes a non-return valve which includes a screw tip having a tip end, a cylindrical shank connected to the tip end, a thrust ring positioned at a rear end of the shank, and a mounting end extending from the rear end of the shank for attachment to a plasticizing screw. A locking ring is placed in concentric relationship to the central shank and is movable in axial direction between an open position, in which a leading sealing surface rests against a shoulder of the tip end, allowing passage of material, and a closed position, in which a trailing seat surface rests against a shoulder of the thrust ring, prohibiting entry of material. The locking ring together with the shank defines an annular gap and has one end face positioned in opposition to the mounting end and formed with bores for passage of material.

While such a construction of the backflow prevention device enables a rotatable support of the locking ring upon the screw tip in an enclosed bearing, the provision of a kneading or mixing effect by this construction is not contemplated in any way so that material flowing through the backflow prevention device may not be mixed or homogenized sufficiently enough. German Pat. No. 198 36 871 attempts to address this problem of insufficient mixing or homogenization by applying vibration in axial direction in the area of the material passage during rotation of the screw. However, as the applied vibration can only be relatively small, the intended mixing effect is still insufficient.

Another approach to improve a mixing behavior is disclosed in German Pat. No. DE 21 62 709 A1 which describes a non-return valve having a locking ring provided with radially inwardly directed teeth and a screw shank provided with radially outwardly directed teeth. The teeth of the screw shank are disposed in axial offset relationship to the teeth of the locking ring such that the teeth of locking ring and screw shank cannot interlock during movement of the locking ring from the open position to the closing position, or vice versa. To prevent an incidental overlap of the teeth of the locking ring in axial direction with the teeth of the screw shank, the locking ring is restrained in the plasticizing cylinder against rotation.

However, for a number of reasons, the various proposals are endowed with drawbacks and shortcomings relating for example to a complex structure or to the effect that is hoped to be obtained but may not always be realized.

It would therefore be desirable and advantageous to provide an improved backflow prevention device to obviate prior art shortcomings and to realize superior mixing and homogenization results while yet being simple in structure.

SUMMARY OF THE INVENTION

According to one aspect of the present invention, a backflow prevention device for an injection molding machine, includes a screw tip defined by a longitudinal axis and having a tip end, a central body member connected to the tip end, a thrust ring positioned at a rear end of the body member, and a mounting end extending from the rear end of the body member for attachment to a plasticizing screw, a locking ring arranged in coaxial relationship to the longitudinal axis and having first and second sealing surfaces, wherein the locking ring is movable in the direction of the longitudinal axis between an open position, in which the first sealing surface rests against a shoulder of the tip end, allowing passage of material, and a closed position, in which the second sealing surface rests against a shoulder of the thrust ring, prohibiting entry of material, wherein the locking ring and the body member define together an annular gap, and at least one kneading or mixing element disposed in the annular gap and constructed in the form of a circular ring in coaxial relationship to the locking ring, wherein the mixing element has circumferential bores in spaced-apart disposition for transport of material in the direction of the longitudinal axis.

As an alternative or in addition, the locking ring may have an end piece adjacent the tip end and constructed to serve as mixing element having circumferential spaced-apart bores in offset relationship so as to split a material flow in different directions to thereby attain an additional thorough mixing.

According to another feature of the present invention, the bores of the mixing element may extend at an inclination and/or may be skewed in relation to the longitudinal axis. In this way, the material flow can be further divided in radial direction or circumferential direction to further contribute to a thorough mixing result.

The mixing element may be connected with the locking ring or with the body member. Suitably, the backflow prevention device according to the present invention has a plurality of such mixing elements disposed along the annular gap in side-by-side relationship. The mixing effect can be enhanced when bores of neighboring mixing elements are disposed in offset relationship in circumferential direction and/or opposite bores of neighboring mixing elements are oriented in different directions.

As a consequence of the arrangement of the mixing elements, the pressure drop at the backflow prevention device may increase, possibly resulting in increased wear at the shoulders and sealing surfaces on the side of the tip end. Thus, according to another feature of the present invention, the shoulders and/or the sealing surfaces are provided with a wearing protection.

According to another feature of the present invention, the tip end and the shoulder of the thrust ring may be formed with channels, which may be configured in the form of outwardly open spirally-shaped arms. In this way, wear of the contact surface between the screw tip and the locking ring is minimized.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
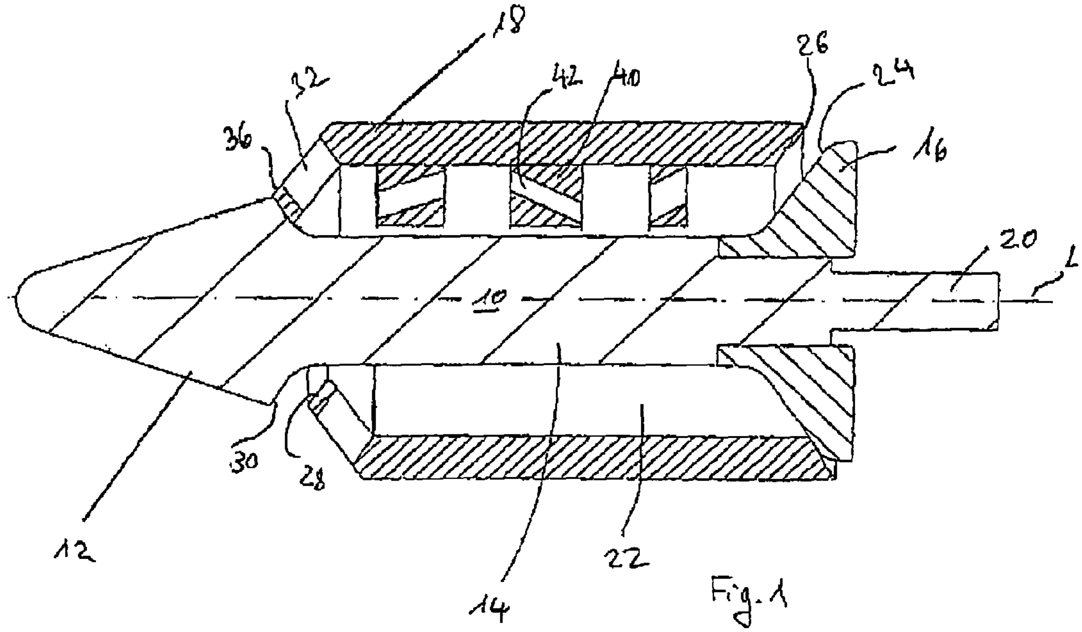
FIG. 1 is a side elevational view, in cross section, of a backflow prevention device according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a side elevational view, in cross section, of a backflow prevention device according to the present invention for use with a plasticizing and injection screw which is axially movable in a surrounding tubular barrel of an injection molding machine. The backflow prevention device includes a screw tip 10, which defines a longitudinal axis L and has a discharge-side tip end 12, a central body member 14 in the form of a cylindrical rod and a mounting end 20 for attachment to a forward end of the screw. The description below will center on the configuration of the screw tip so that the screw and the barrel, which do not form part of the present invention, are not shown in detail for the sake of simplicity. As is generally known, the screw is rotated to convey plasticized material along the screw to its forward end. When a predetermined volume of plasticized material has been accumulated ahead of the screw, the screw is moved axially forward toward an outlet in the barrel, to thereby force the plasticized material through the outlet into a cavity of an adjacent injection mold. During injection, the backflow prevention device prohibits a flow of plasticized material from the space ahead of the screw back into the screw flights of the plasticizing screw, as the screw moves forward and pressure builds up, to ensure a proper injection of a predetermined quantity of plasticized material into the mold cavity.

Figure 2:
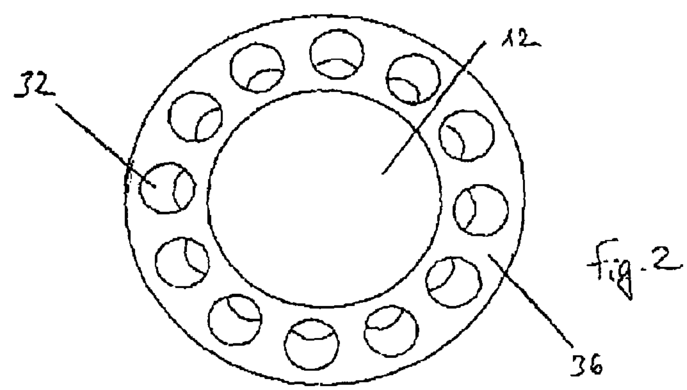
FIG. 2 is a front elevational view of the backflow prevention device of FIG. 1.

The screw tip 10 supports a thrust ring 16 between the mounting end 20 and the body member 14. Disposed in concentric relationship to the body member 14 is a locking ring 18 which together with the body member 14 defines an annular gap 22 and is movable in axial direction relative to the screw tip 10 between an open position, shown in the upper half of FIG. 1, allowing passage of material, and a closed position, shown in the lower half of FIG. 1, prohibiting entry of material. The locking ring 18 has adjacent to the tip end 12 a discharge-side end piece 36 (left hand side of FIG. 1) which has a frustoconical configuration and is formed with bores 32 for passage of plasticized material. As shown in FIG. 2, the bores 32 are arranged in spaced-apart relationship about the frustoconical end piece 36 of the locking ring 18.

Positioned in the annular gap 22 are kneading or mixing elements 40 which have the shape of circular rings and are provided about their circumference with bores 42. For sake of simplicity, the mixing elements 40 are shown only in the upper half of FIG. 1. The bores 42 in the mixing elements 40 are inclined with respect to the longitudinal axis L in such a manner that a material flow is either directed away from the central body member 14 or directed toward the central body member 14. The bores 42 may be disposed in offset relationship and they may also be skewed in relation to the longitudinal axis L. In this way, the material flow can be further split in radial direction or circumferential direction to further contribute to a thorough mixing result. Hereby, one bore may for example extend from an area in proximity of the screw tip 10 and terminate in radial and circumferential directions offset in proximity of the locking ring 18.

The locking ring 18 has a first sealing surface 28, which abuts against a shoulder 30 of the tip end 12 in the open position of the locking ring 18, and a second sealing surface 26, which abuts against a shoulder 24 of the thrust ring 16 in the closed position of the locking ring 18. In the open position, a material flow is able to pass through a gap between the shoulder 24 and the sealing surface 26 and to flow through the annular gap 22, the bores 42 and the bores 32 for discharge. In the closed position, the locking ring 18 assumes the right hand position, shown in the lower half of FIG. 1, in which the gap between the shoulder 24 and the sealing surface 26 is sealed so as to prohibit a forced flow of material back into the direction of the screw.

Figure 3:
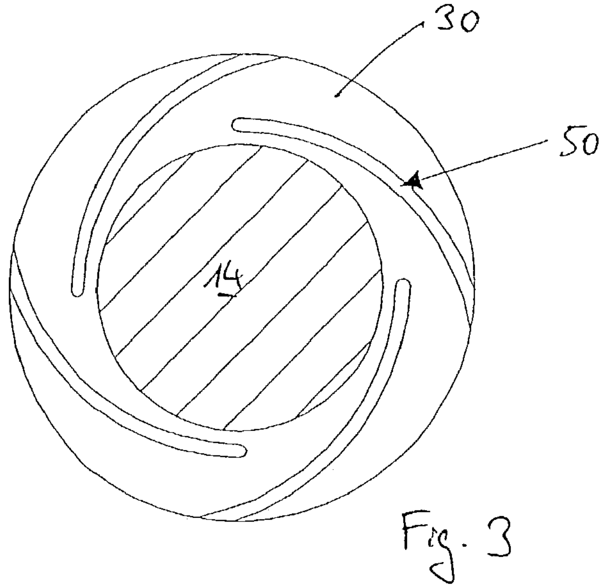
FIG. 3 is a rear elevational view, partly broken away, of a tip end of a screw tip of the backflow prevention device.

As shown in FIG. 3, which is a rear elevational view, partly broken away, of the tip end 12 of the screw tip 10 of the backflow prevention device, it can be seen that the shoulder 30 is formed with cooling channels 50 having a spiral arm like configuration. When friction is encountered during rotation of the plasticizing screw between the locking ring 18 and the screw tip 10, plasticized material is diverted to the shoulder 30 by the pressure drop and the approach velocity so as to assume the function as lubricating film as well as cooling agent to dissipate the friction heat.

Figure 4:
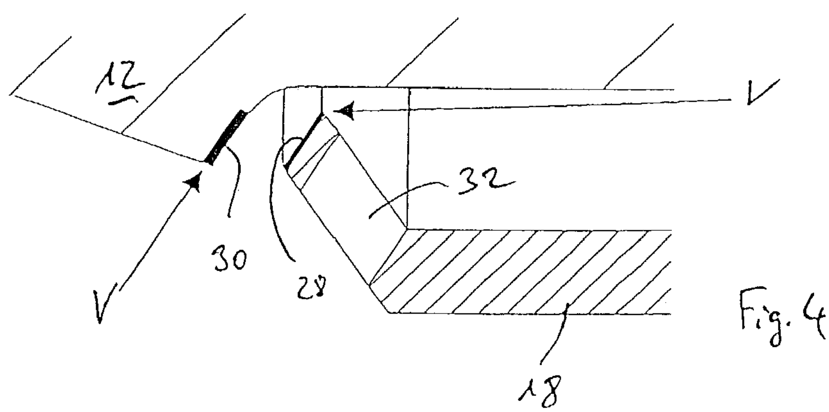
FIG. 4 is an enlarged detailed view of a contact zone between the screw tip and a locking ring.

In order to impart a protection against wear, the leading sealing surface 28 and the shoulder 30 of the tip end 12 are provided with a wearing protection V, as shown in FIG. 4, e.g., in the form of an applied wear-resistant layer or through special material treatment.

Figure 5:
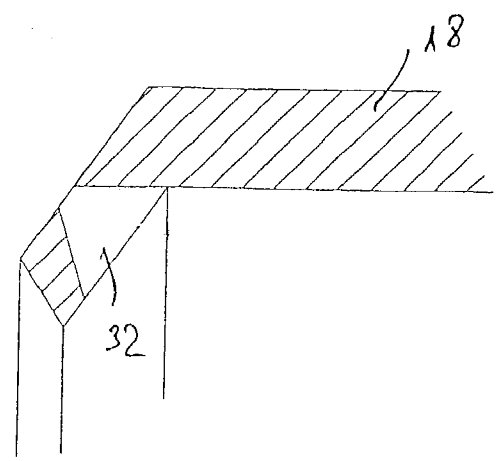
FIG. 5 is an enlarged detailed view of a material exit opening in the locking ring.

The relationship between the entire locking ring area (flow at the forward end) and the sum of the areas of the passages (flow area through bores) is determinative for the closing behavior of the backflow prevention device, i.e. a decrease in the area of passage (decrease in number of bores or in cross section) results in an enhanced closing action of the backflow prevention device. This may result, however, in a rise of the pressure drop of the backflow prevention device and thus in increased wear of the contact surface between locking ring 18 and the screw tip 10. This can be countered by a particular configuration of the passages, e.g. bores 32. An example of an appropriate configuration may include perforated disks of granulators. FIG. 5 shows a suitable configuration, with the bores 32 having a frustoconical shape.

Figure 6:
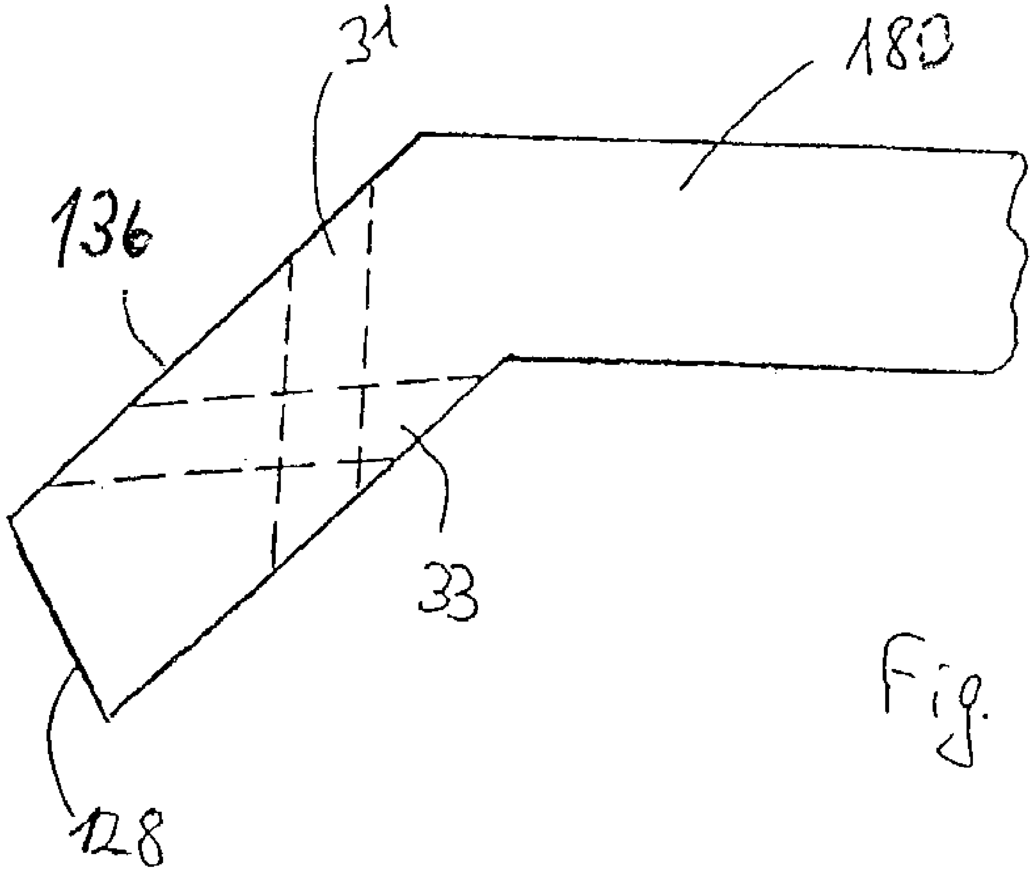
FIG. 6 is a fragmentary enlarged detailed view of the discharge-side end of a modified locking ring.

Turning now to FIG. 6, there is shown a fragmentary, enlarged detailed view of the discharge-side end of a locking ring of another embodiment of a backflow prevention device according to the invention. In the following description, parts corresponding with those in FIG. 1 will be identified by corresponding reference numerals, each increased by "100". The description below will center on the differences between the embodiments. In this embodiment, the locking ring 180 has a discharge-side end piece 136 which by itself is configured to assume the function of a mixing element. The end piece 136 has mixing bores 31 and 33, which are shown in FIG. 6 by way of dash-dot lines. Hereby, the mixing bore 33 directs the material flow in the direction of the tip end 12 of the screw tip 10, whereas the mixing bore 31 directs the material flow toward the wall of the surrounding barrel. These mixing bores 31, 33 may be distributed about the circumference of the end piece 136 in alternating fashion and may be configured in a manner as described in connection with the bores of the mixing elements 40 of FIG. 1. Although not shown in FIG. 6, the backflow prevention device may, of course, also include the mixing elements 40, as described in connection with the embodiment of FIG. 1.

The dimensions of the mixing elements 40, the shape, disposition, dimension and pattern of the bores 31, 32, 33 and 42 may be selected in dependence on a desired closing behavior and mixing result, as indicated also in FIG. 1 by the different configurations of the mixing elements 40. Of course, it is basically also possible to attach the mixing elements 40 to the central body member 14 of the screw tip 10, instead of the locking ring 18. Persons skilled in the art will also appreciate that the mounting end of the screw tip may be configured in single-piece construction with the thrust ring and the body member. In this case, the tip end is secured to the body member, e.g. through a screw connection.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A backflow prevention device for an injection molding machine, comprising:

a screw tip defined by a longitudinal axle and having a tip end, a central body member connected to the tip end, a thrust ring positioned at a rear end of the body member, and a mounting end extending from the rear end of the body member for attachment to a plasticizing screw;

a locking ring arranged in coaxial relationship to the longitudinal axis and having first and second sealing surfaces, said locking ring being movable in the direction of the longitudinal axis between an open position, in which the first sealing surface rests against a shoulder of the tip end, allowing passage of material, end a closed position, in which the second sealing surface rests against a shoulder of the thrust ring, prohibiting entry of material, wherein the locking ring and the body member define together an annular gap; and at least one mixing element disposed in the annular gap and constructed in the form of a circular ring in coaxial relationship to the looking ring, said mixing element having circumferential bares in spaced-apart disposition for transport of material in the direction of the longitudinal axis.

2. The device of claim 1, wherein the locking ring has an end piece adjacent the tip end and constructed to serve as mixing element having circumferential spaced-apart mixing bores in offset relationship.

3. The device of claim 1, wherein the bores of the mixing element extend at an inclination in relation to the longitudinal axis.

4. The device of claim 1, wherein the bores of the mixing element are skewed in relation to the longitudinal axis.

5. The device of claim 1, wherein a first plurality of bores of the mixing element extend at an inclination in relation to the longitudinal axis, and a second plurality of bores of the mixing element are skewed in relation to the longitudinal axis.

6. The device of claim 1, wherein the mixing element is connected with the locking ring.

7. The device of claim 1, wherein the mixing element is connected with the body member.

8. The device of claim 1, and further comprising a plurality of said mixing element disposed axially along the annular gap in side-by-side arrangement.

9. The device of claim 8, wherein opposite bores of neighboring mixing elements are disposed in offset relationship.

10. The device of claim 8, wherein bores of neighboring mixing elements are oriented in different directions.

11. The device of claim 1, wherein at least one of the shoulder of the tip end and the shoulder of the thrust ring is formed with channels.

12. The device of claim 10, wherein the channels are configured In the form of outwardly open spirally-shaped arms.

13. The device of claim 1, wherein at least one of the shoulder of the tip end, the shoulder of the thrust ring, the first and second sealing surfaces, is provided with a wearing protection.

14. The device of claim 1, wherein the locking ring includes a forward end piece having a frustoconical configuration and formed with bores for discharge of plasticized material.

15. The device of claim 14, wherein the bores of the end piece have a frustoconical configuration.

16. A backflow prevention device for an injection molding machine, comprising:

a screw tip defined by a longitudinal axis and having a tip end, a central body member connected to the tip end, a thrust ring positioned at a rear end of the body member, and a mounting end extending from the rear end of the body member for attachment to a plasticizing screw; and a locking ring arranged in coaxial relationship to the longitudinal axis and having first and second sealing surfaces, said locking ring being movable in the direction of the longitudinal axis between an open position, in which the first sealing surface rests against a shoulder of the tip end, allowing passage of material, and a closed position, in which the second sealing surface rests against a shoulder of the thrust ring, prohibiting entry of material, wherein the locking ring and the body member define together an annular gap, wherein the locking ring has an end piece adjacent the tip end and constructed to serve as mixing element having circumferential spaced-apart mixing bores in offset relationship, wherein a first plurality of bores of the end piece directs a material flow in a substantially axial direction, and a second plurality of bores of the end piece directs a material flow in a substantially radial direction.

17. The device of claim 16, wherein the bores of the first and second pluralities of bores are distributed about the circumference of the end piece in alternating fashion.

18. The device of claim 16, wherein at least one of the shoulder of the tip end and the shoulder of the thrust ring is formed with channels.

19. The device of claim 18, wherein the channels are configured in the form of outwardly open spirally-shaped arms.

20. The device of claim 16, wherein at least one of the shoulder of the tip end, the shoulder of the thrust ring, the leading sealing surface and the trailing sealing surface, is provided with a wearing protection.

* * * * *

UNITED STATES PATENT AND TRADEMARK OFFICE

CERTIFICATE OF CORRECTION

PATENT NO. : 7,033,163 B2
APPLICATION NO. : 10/419716
DATED : April 25, 2006
INVENTOR(S) : Martin Würtele It is certified that error appears in the above-identified patent and that said Letters Patent is hereby corrected as shown below:

Column 5, line 50: Change “axle” to --axis--

Column 6, line 1: Change “bares” to --bores--

Column 6, line 34: Change “ln” to --in--

Signed and Sealed this

First Day of August, 2006

JON W. DUDAS
*Director of the United States Patent and Trademark Office*